United States Patent [19]

Eskelinen

[11] Patent Number: 5,540,533
[45] Date of Patent: Jul. 30, 1996

[54] MASS DISCHARGER FOR A CONTAINER SUCH AS A SILO, INCLUDING A JOINTED CONVEYER OPERATING FROM ABOVE

[76] Inventor: Kalevi Eskelinen, FIN-41330 Vihtavuori, Vihtavuori, Finland

[21] Appl. No.: 290,988
[22] PCT Filed: Feb. 17, 1993
[86] PCT No.: PCT/FI93/00052
§ 371 Date: Aug. 22, 1994
§ 102(e) Date: Aug. 22, 1994
[87] PCT Pub. No.: WO93/16944
PCT Pub. Date: Sep. 2, 1993

[30] Foreign Application Priority Data

Feb. 21, 1992 [FI] Finland ............................ 920160

[51] Int. Cl.⁶ ........................................ B65G 65/38
[52] U.S. Cl. ...................... 414/313; 414/142.2; 414/327
[58] Field of Search ............... 414/140.8, 140.9, 414/141.1, 141.2, 142.1, 142.2, 142.5, 295, 300, 313, 316, 318, 327

[56] References Cited

U.S. PATENT DOCUMENTS

| 231,721 | 8/1880 | Imhorst | 414/141.1 |
| 4,020,956 | 5/1977 | Van Hille | 414/327 X |
| 4,042,094 | 8/1977 | Schmermund | 414/295 X |
| 4,042,129 | 8/1977 | Hampton | 414/313 |
| 4,350,467 | 9/1982 | Soros | 414/313 X |
| 5,372,468 | 12/1994 | Ihle | 414/313 |

FOREIGN PATENT DOCUMENTS

| 3608116 | 5/1987 | Germany | 414/141.1 |
| 3800605 | 7/1989 | Germany | 414/316 |
| 5139542 | 6/1993 | Japan | 414/313 |
| 2036686 | 7/1980 | United Kingdom | 414/313 |
| 2262930 | 7/1993 | United Kingdom | 414/327 |
| 8402112 | 6/1984 | WIPO | 414/142.2 |

Primary Examiner—James W. Keenan
Attorney, Agent, or Firm—C. J. Fildes & Co.

[57] ABSTRACT

A mass discharger for discharging a bulk mass from a container, such as a silo. The discharger includes a scraper conveyor jointed next to the edge of the side of the discharge end of the container and extending essentially the length of the container and over the edge. The scraper conveyor includes an endless conveyor chain having attached scrapers and a second joint between longitudinal ends of the chain such that the scraper conveyor rests against the discharge side and the bottom of the container while it is emptying it from the upper surface of the bulk mass. The discharger includes lifting devices for raising the scraper conveyor to an upper position for filling of the silo.

6 Claims, 3 Drawing Sheets

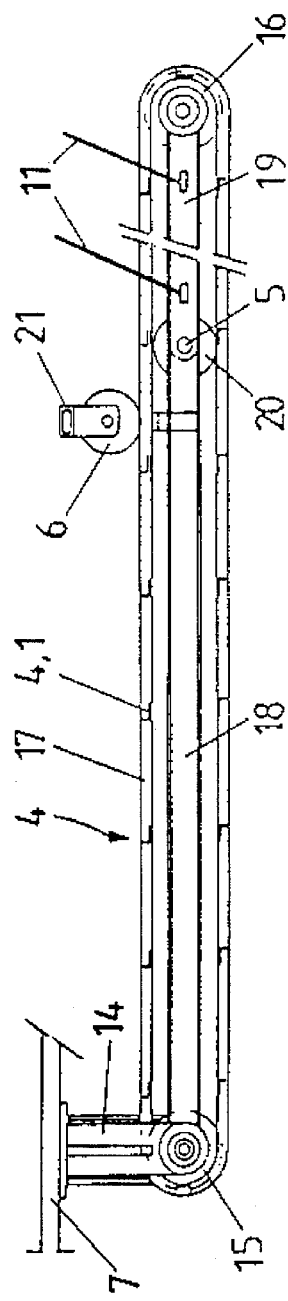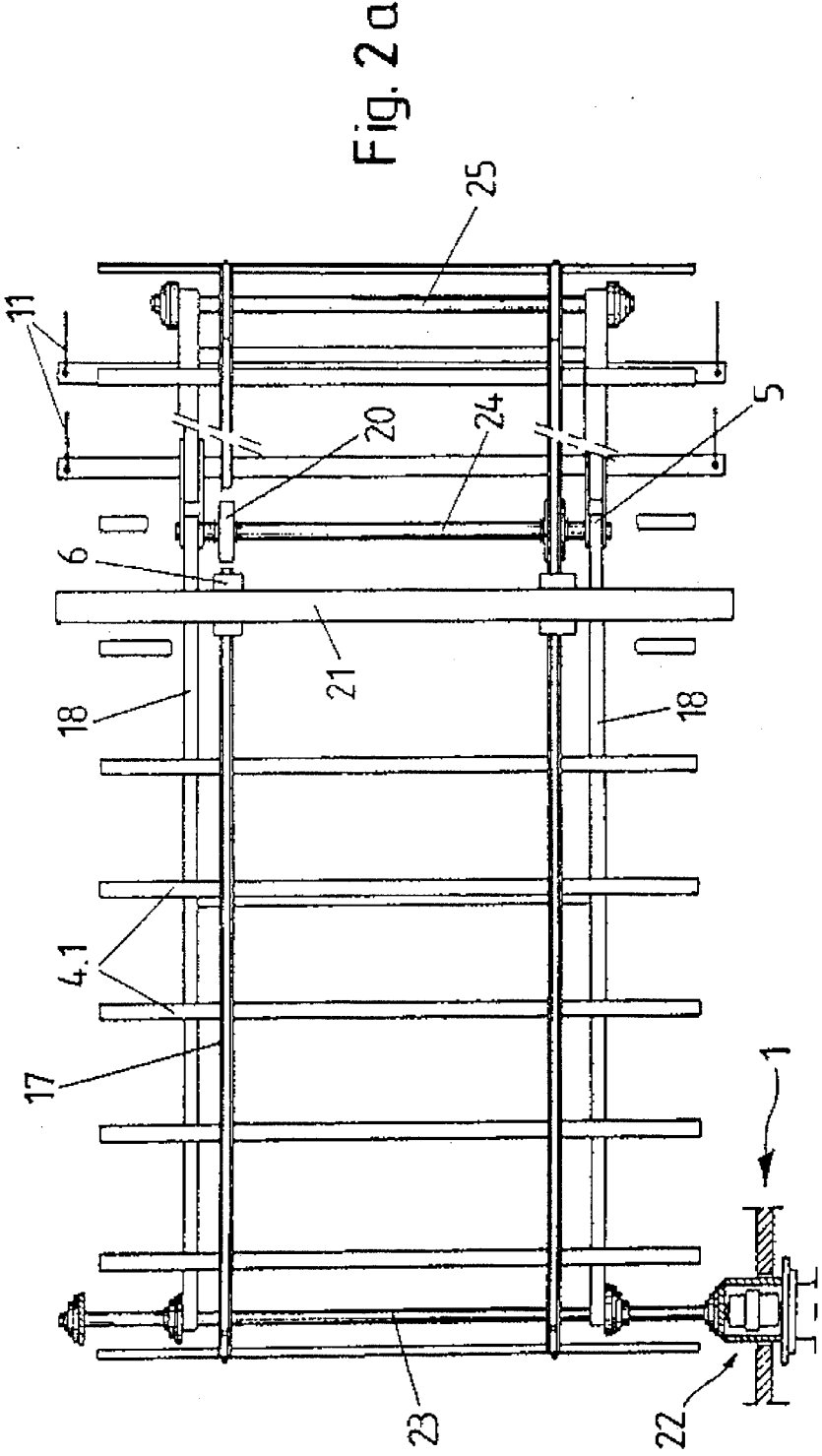

MASS DISCHARGER FOR A CONTAINER SUCH AS A SILO, INCLUDING A JOINTED CONVEYER OPERATING FROM ABOVE

The invention relates to a discharger for discharging peat or other bulk mass from a container, like a silo, and which includes a transfer member that moves the mass from an upper surface of the mass to outside the silo or other container.

Peat is known to be a material that is difficult to store. It easily tends to arch onto the sides of the silo, so that discharge devices on the bottom of the silo only form a hollow inside the peat mass. In winter in particular arching is a very great problem, which attempts have been made to overcome by means of heating and vibration.

There are also known discharge devices operating from above, which may consist of, for example, a screw conveyor installed in the middle of a high cylindrical storage tank. In this case too, however, there is a danger of arching as the screw eats a hollow in the middle of the mass. For a low silo in particular, there is nothing else available than dischargers that operate from below.

The present invention provides a new kind of discharger that operates from above, which does not have the drawbacks mentioned above and which therefore operates reliably in winter too. The characteristic features of a discharger in accordance with the invention are presented in the appended claims. A discharger in accordance with the invention operates so reliably that it can also be used as a batcher. The size of the batch can then be controlled by means of the speed of rotation of the scraper conveyor. With the aid of a discharger in accordance with the invention it is also possible to fill a low silo up to the brim, as the rotating scraper conveyor levels the mass deposited in the silo.

In what follows the invention is illustrated by reference to the accompanying figures, which show one discharger in accordance with the invention in connection with a sludge treatment unit.

FIGS. 2a and 2b show side and top views of a separate scraper conveyor.

Figure 1:
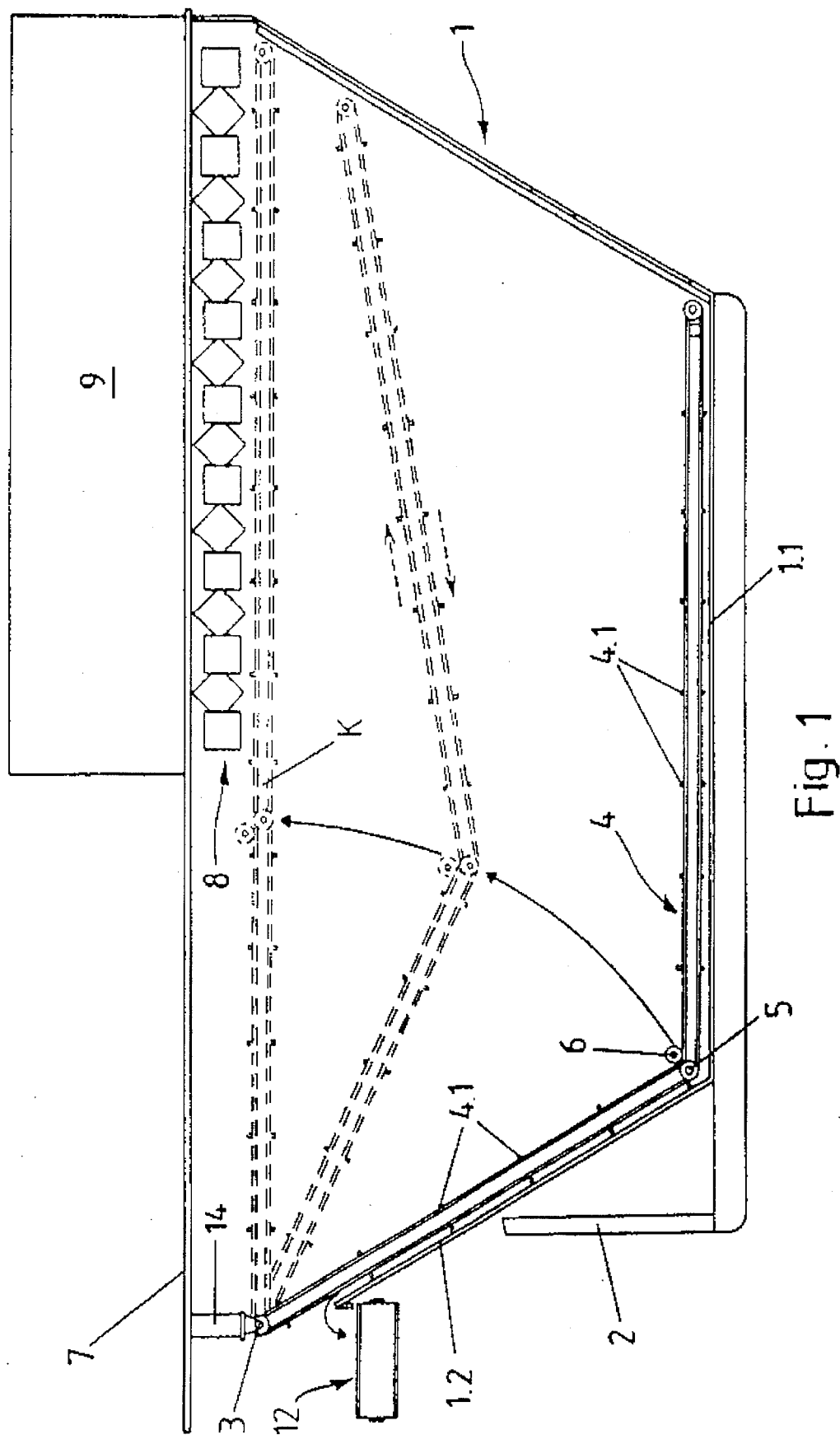
FIG. 1 shows a cross-section of a silo equipped with a discharger in accordance with the invention.

Referring to the drawings in detail, a silo 1 is constructed on a casette base 2. The side 1.2 of the discharge end and the base 1.1 of the silo are marked separately. The top of the silo 1 includes a cover construction 7, in which there is a feed opening and sides 9 running round it. A disk screen 8 is arranged inside the silo, next to the opening. A scraper conveyor 4, which is shown in three different positions in FIG. 1, is connected by means of joint 3 formed in axle 23 next to the discharge opening in the cover construction 7. The situation shown by a solid line shows the silo empty and the position K shows the silo full, while one intermediate position is drawn between them.

The scraper conveyor 4 consists of moving scrapers 4.1 and a joint 5, which makes it possible to turn the scraper conveyor against the sides 1.2 and the bottom 1.1. The Figure shows the auxilliary wheel 6 required in the jointing. The scraper conveyor rotates in such a way that its lower part moves in the direction of the side 1.2 and the mass is thus scraped from the surface over the edge of the silo to the conveyor 12. The scrapers 4.1 are of L-section steel welded to a chain 17. Other shapes such as T-section can be used, but it is advantageous to set the free flange or the hollow of the scraper against the mass, in which case it can tear open the surface of a frozen mass.

During filling, the scraper conveyor is raised into position K by means of the raising device 10 and cables 11 and is then started. As the mass drops from the feed opening through the disk screen 8 and the scraper conveyor 4, the scraper conveyor levels the mass in the silo 1 and achieves the precise filling of the entire silo 1.

During operation, the scraper conveyor is not attached other than at the jointing 3 and it rests its own weight on top of the peat mass in the silo.

FIGS. 2a and 2b show the construction of the scraper conveyor in greater detail. In the Figures the right side of the scrape conveyor is cut and in reality it is longer than the left side. The scraper conveyor 4 is principally formed by chains 17 rotating around guide rollers 15 and 16 on axles 23 and 25 and of scrapers 4.1 attached to them. The axle 23 of the front guide roller 15 is attached to the cover structure 7 by bracket 14 are the axle is rotated by means of motor 22, which is installed on the wall of the silo 1.

The above-mentioned guide rollers 15 and 16 are attached by bearings to the frame components 18 and 19, which are in turn mutually jointed by means of joint 5 formed in axle 24. Auxiliary 20 is located on this axle of joint 5 and auxiliary wheel 6 is located on support structure 21 in the region of this above the chain a little in the direction of the discharging end. Auxiliary wheel 6 forces the chains to travel essentially through the point of change of direction.

Figure 3:
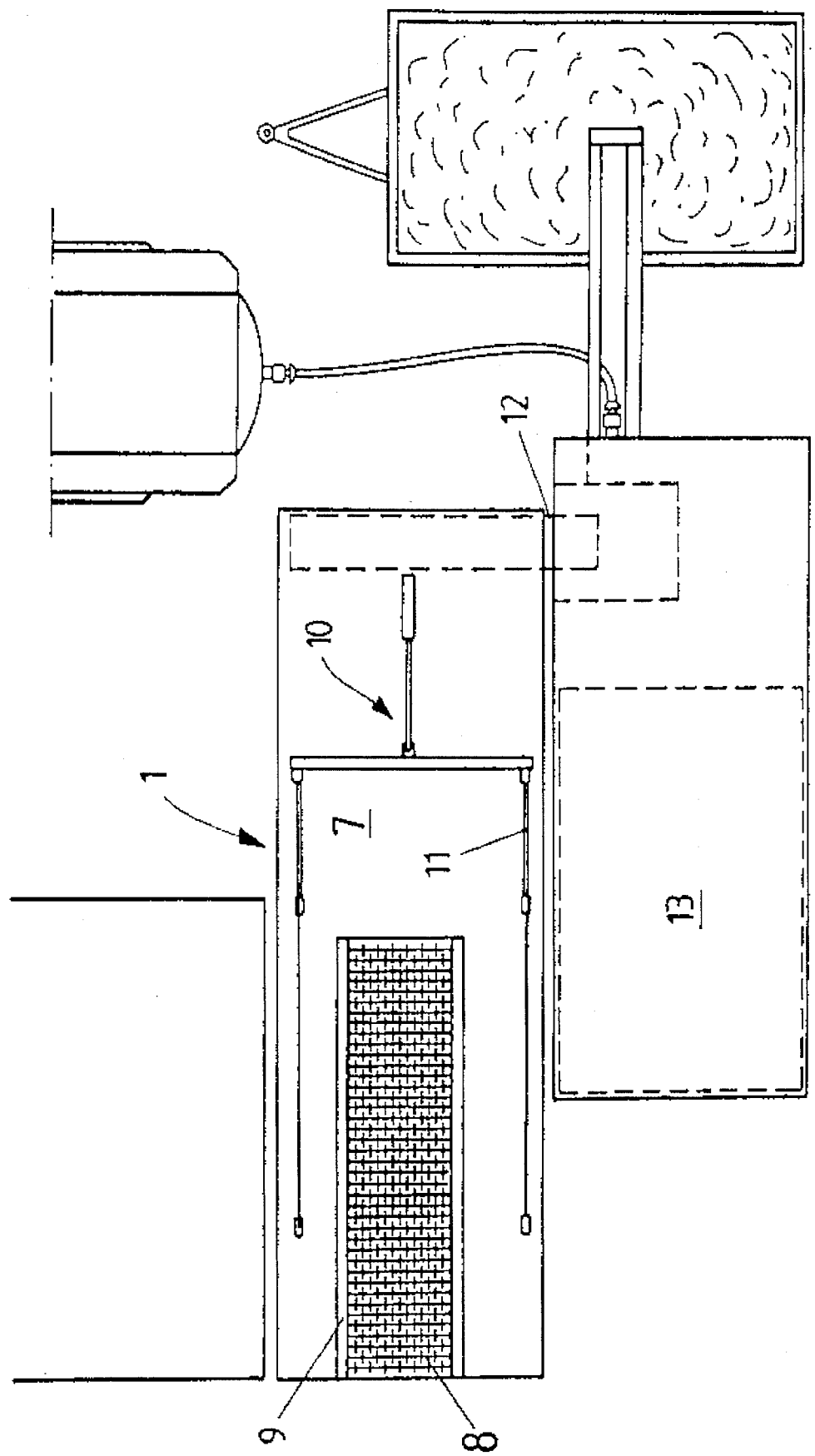
FIG. 3 shows the installation of a silo including a discharger in accordance with the invention in connection with a sludge treatment unit.

Silo discharge in accordance with the invention can be used for many kinds of purposes. An example of this is the arrangement in accordance with FIG. 3, in which silo 1 is located in connection with a sewage treatment unit 13. From on top of the silo 1 the disk screen and the deflection plates surrounding it are seen through the feed opening. Lifting device 10, which, if necessary, raises the scraper conveyor through cables 11, is located on top of the covered silo. The measured amount of the peat mass is transferred to the sewage treatment unit 13 by means of the conveyor belt 12.

The discharger in accordance with the invention can naturally be used for the movement of masses of nearly all kinds.

I claim:

1. A mass discharger for discharging a bulk mass from a container, said container having a bottom and upstanding sides with an interior length extending to a discharge end formed by a sloping side with an upper edge, said discharger including a support structure supporting said discharger, operating devices for operating said discharger and a transfer device for moving an upper surface of the mass to outside said container, characterized in that said transfer device is a scraper conveyor articulated by a first joint next to said edge and extending essentially for said length of said container and over said edge, said scraper conveyor including an endless conveyor chain having attached scrapers and extending to longitudinally opposite ends of said scraper conveyor, and a second joint spaced from said first joint and intermediate said longitudinal ends such that the scraper conveyor rests against said side adjacent to the first joint and against said bottom of the container when it is empty, said scraper conveyor including first and second longitudinal frame components of which said first frame component is jointed by said first joint near said edge and said second frame component is jointed to said first frame component by said second joint, a guide wheel located above said scraper conveyor in the area of said second joint but offset slightly toward said first joint to turn the conveyor chain when the scraper conveyor bends at the second joint, and said discharger includes lifting devices for raising said scraper conveyor to an upper position for filling said container.

2. A discharger in accordance with claim 1, characterized in that said first joint includes a first axle and bearing, by which said axle is carried in said support structure, said first axle also being linked by bearings to said first frame component, and said operating devices include a drive motor arranged to rotate said first axle and a guide wheel on said axle driving said chain of the scraper conveyor.

3. A discharger in accordance with claim 2, characterized in that said second joint includes a second axle extending through adjoining ends of both frame components and permitting them to pivot mutually, and that said second axle carries an auxiliary wheel supporting said chain of the scraper conveyor at said second joint.

4. A discharger in accordance with claim 1, characterized in that said lifting devices include pulling devices connected by cables to the second frame component.

5. A discharger in accordance with claim 1, characterized in that said scrapers are spaced longitudinally along the scraper conveyor to permit filling of the container through the scraper conveyor from the top.

6. A discharger in accordance with claim 1, characterized in that the scrapers of the scraper conveyor are formed from L or T steel section.

* * * * *